United States Patent [19]

Hwang et al.

[11] Patent Number: 4,866,940
[45] Date of Patent: Sep. 19, 1989

[54] COMPUTER AIDED TUNING OF TURBINE CONTROLS

[75] Inventors: Edward Y. Hwang, Winter Park, Fla.; Timothy D. Thomas, Leechburg, Pa.

[73] Assignee: Westinghouse Electric Corp., Pittsburgh, Pa.

[21] Appl. No.: 223,321

[22] Filed: Jul. 25, 1988

[51] Int. Cl.[4] .............................................. F01K 13/02
[52] U.S. Cl. ....................................... 60/646; 60/657; 60/660; 137/487.5
[58] Field of Search .......................... 60/646, 657, 660; 137/487.5

[56] References Cited

U.S. PATENT DOCUMENTS

| | | | |
|---|---|---|---|
| 4,246,491 | 1/1981 | Waldron et al. | 60/660 X |
| 4,603,394 | 7/1986 | Bukowski et al. | 60/660 X |
| 4,811,565 | 3/1989 | Hwang | 60/660 X |

OTHER PUBLICATIONS

Process Plus Brochures with a cover letter of 2/1988.
"Use an IBM PC Simulator to Troubleshoot and Analyze Industrial Process Control Loops" by John P. Gerry, P.E., presented at Control Expo 87.

*Primary Examiner*—Allen M. Ostrager
*Attorney, Agent, or Firm*—K. Bach

[57] ABSTRACT

A method for automatically calibrating a controller for a valve controlled system follows consistent procedures to make precise adjustments to valve characteristics. The controller is placed in a calibration mode, then the valve settings are modified over a full range of operation. At predetermined levels of operation, the valve settings are maintained at preset values while system performance is measured. After the full range of valve operation has been covered, adjustments are made to the correspondence between the valve settings and the levels of operation in dependence upon the differences between the measured system performance and the predetermined levels of operation. This procedure is repeated to provide average values and also to make changes to valve characteristic curves corresponding to different modes of operation such as single valve and sequential valve modes. Other control parameters may be adjusted by evaluating system performance during normal operation.

10 Claims, 8 Drawing Sheets

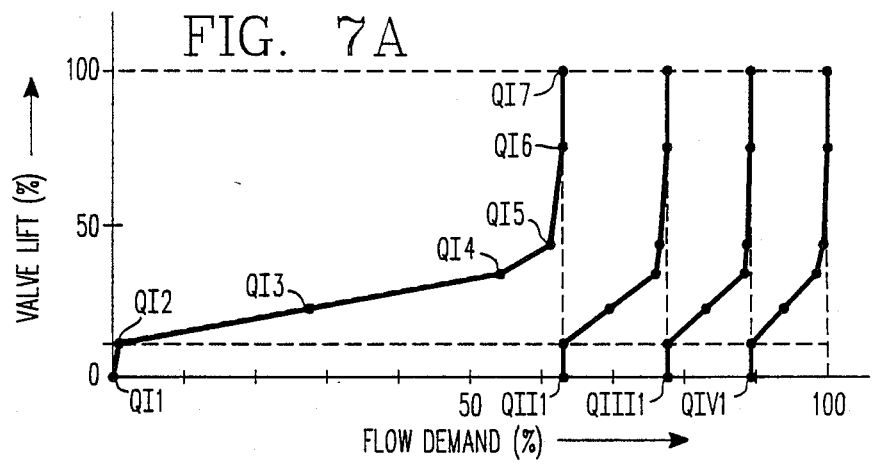
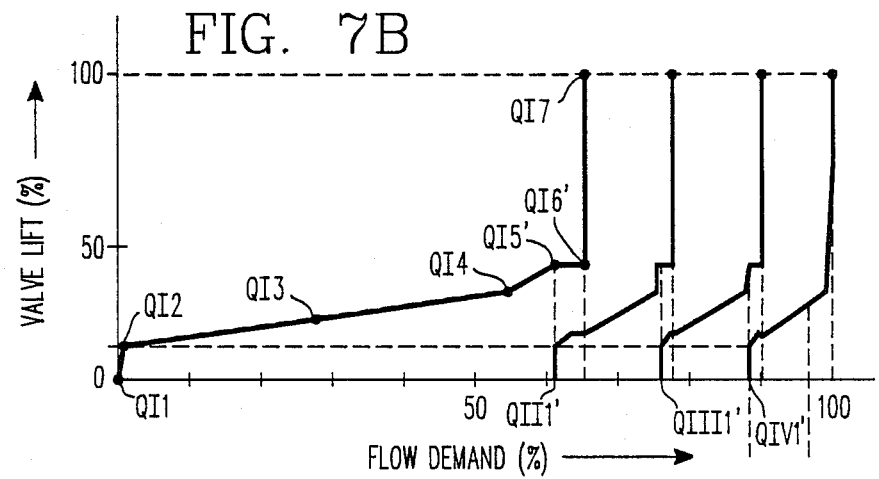
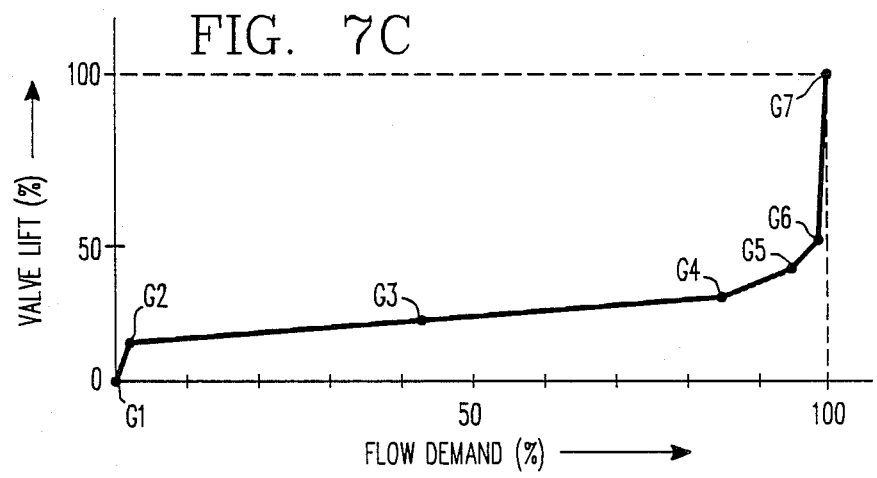

COMPUTER AIDED TUNING OF TURBINE CONTROLS

CROSS-REFERENCE TO RELATED APPLICATION

This application is related to U.S. patent application Ser. No. 153,301 filed Feb. 5, 1988 U.S. Pat. No. 4,811,565.

BACKGROUND OF THE INVENTION

1. Field of the Invention

The present invention is related to automatic control of valve controlled equipment such as steam turbines and, more particularly, to a method for automatic calibration of a steam turbine.

2. Description of the Related Art

There are many types of equipment and systems, from small engines up to entire plants, which include a system of valves controlled by an automatic controller. One example of such equipment is a steam turbine used to generate electricity. The amount of steam received by such a turbine from a boiler, heated by fossil fuel or a nuclear reactor, is controlled by inlet valves including throttle valves and governor valves. Typically, there are six to eight governor valves which are operated in one of two modes. In a single valve or unison mode, all the valves are opened at the same rate, while in a sequential mode, a group of valves are initially opened and then smaller groups of 1 to 3 valves are opened in sequence as additional flow is demanded.

Proper control of equipment, such as an electricity generating steam turbine, requires that the correspondence between valve settings and performance of the equipment or system be known. The designer of such equipment can determine the correspondence between the valve settings and the system performance with a degree of precision that varies depending on the complexity of the equipment or system and the environment or application in which the equipment is used. The use of feedback loops in automatic controllers is one way to correct for differences between the designed correspondence between valve settings and system operation and the actual operation under specific conditions. However, it is desirable to modify or make adjustments to the original correspondence between valve settings and system performance when the equipment is installed so that the delays involved in relying upon feedback loops can be reduced and the equipment can respond to changes in operating parameters more quickly and efficiently.

Conventionally, calibration of most valve controlled equipment, including steam turbines used for generating electricity, involves following a manual procedure to check the correspondence between specific valve settings and the system performance expected for those valve settings. Inevitably, there are variations in how the manual procedures are executed depending upon who performs the calibration and even variations by the same person over a period of time. In addition, the more complex the equipment or system, the more time consuming the calibration procedure becomes and a greater number of opportunities for variation are present.

SUMMARY OF THE INVENTION

An object of the present invention is to provide a more consistently reproducible method of calibrating an automatic controller of valve controlled equipment.

Another object of the present invention is to reduce the labor involved in calibrating an automatic controller of valve controlled equipment.

Yet another object of the present invention is to provide a method for more precise calibration of an automatic controller of valve controlled equipment.

The above objects are attained by providing a method of calibrating an automatic controller for a system controlled by adjusting valves in dependence upon a correspondence between valve settings and levels of operation of the system, said method comprising the steps of: establishing a calibration mode of operation of the system; automatically modifying the valve settings over a full range of operation of the valves during operation of the system; automatically maintaining the valve settings at preset values corresponding to predetermined levels of operation during the modifying, the preset values of the valve settings being maintained for a sufficient period of time for the system to substantially reach equilibrium; automatically measuring system performance for each of the preset values of the valve settings; and modifying the correspondence between the valve settings and the levels of operation in dependence upon differences between the system performance measured and each of the predetermined levels of operation.

For valves which operate in both unison and sequential modes, preferably the calibration mode is established by initially placing the system in the sequential mode of valve operation, followed by modifying the correspondence between the valve settings and the levels of operation in the sequential mode and then repeating the method with the system in the unison mode of operation. The correspondence between valve settings and system operation is preferably modified by making changes to one of a unison valve characteristic and a sequential valve characteristic depending on the mode of valve operation selected.

When the above described method is applied to a steam-driven turbine, the method preferably includes additional steps of establishing a normal operation mode of the system; automatically recording the system performance during the normal operation mode; performing computerized evaluation of the system performance recorded during the normal operation mode; and adjusting, in dependence upon the results of the computerized evaluation, positive and negative speed regulation, megawatt trim loop gain, reset time and loop correction range, impulse pressure loop gain and impulse pressure loop reset time.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIGS. 7A-7D are graphical representations of conversion characteristics illustrated in FIGS. 3-5.

DESCRIPTION OF THE PREFERRED EMBODIMENT

Automatic controllers for valve control systems differ in many ways due to their close relationship to the equipment they control. While the present invention can be applied to many different types of automatic controllers, an embodiment will be described for an application of the present invention to a steam turbine used to generate electricity.

Figure 1:
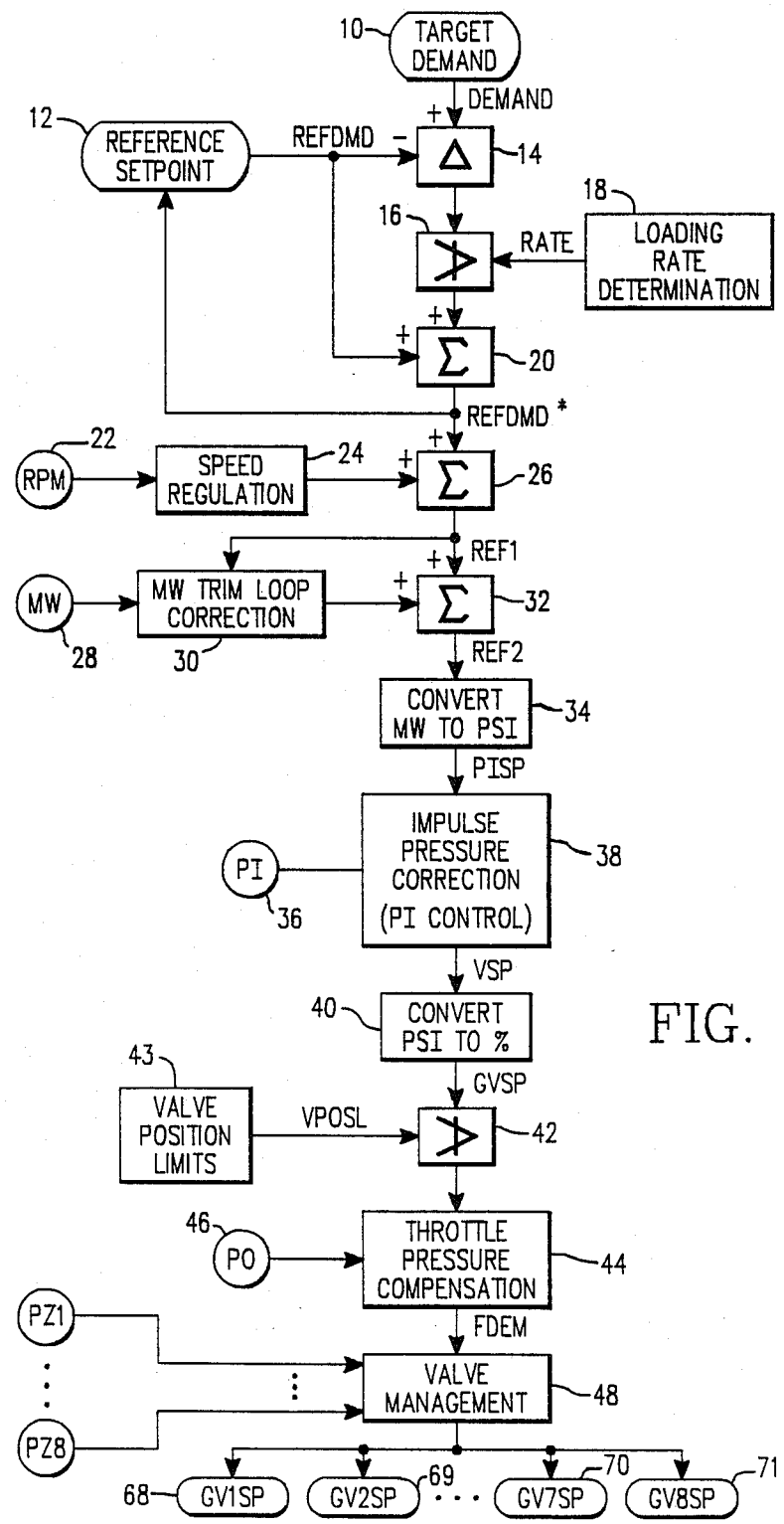
FIG. 1 is a block diagram illustrating how flow demand is calculated from a target demand input by an operator and feedback signals indicating the operating conditions of a steam turbine.

A block diagram of the higher level controls for a steam-driven turbine generator is illustrated in FIG. 1. The operator of the generator enters at 10 an amount of electricity to be generated, typically in megawatts, as a target demand and an initial reference set point 12. The reference set point is subtracted from the target demand in subtractor 14 and limited by limiter 16 in accordance with a loading rate determination 18 which ensures that the system's level of operation does not change too quickly. The resulting limited demand is added back to the reference demand in summer 20 to produce a new reference demand REFDMD* that will be used in the next cycle. The new reference demand REFDMD* is then subjected to correction in dependence upon feedback signals produced by measuring system performance. The first feedback signal is the rotational speed 22 of the turbine. This speed determines the frequency of the electrical energy produced by the generator which, as is known, is strictly regulated within each country. Since the speed can vary from one country or continent to another, the rotational speed 22 is compared with speed regulation 24 to meet the requirements of the electrical net coupled to the generator. The resulting correction factor is added to REFDMD* in summer 26.

The second feedback signal is an indication of the amount of electrical power 28 produced by the generator. As described below, the primary control for the generator is based upon steam flow and pressure. However, the target demand is expressed in electrical power since the purpose of operating the generator is to produce electricity. Due to non-linear losses in the conversion of mechanical energy to electrical energy, megawatt trim loop correction 30 is applied to the intermediate reference demand REF1 in summer 32 to produce electrical demand REF2.

As noted above, the primary controls are based upon steam flow and pressure. Therefore, the electrical demand REF2 is converted at 34 to an impulse pressure set point PISP. An impulse pressure feedback signal 36 is used by impulse pressure correction 38 to generate a valve set point VSP which is in turn converted at 40 from pounds per square inch (PSI) to percent of system operation, indicated in FIG. 1 as GVSP. This value is limited at 42 in accordance with valve position limit 43.

The output of limiter 42 is subjected to throttle pressure compensation 44 in response to feedback signal PO 46. The output from the throttle pressure compensation 44 is applied as flow demand FDEM to valve management control 48.

Figure 2:
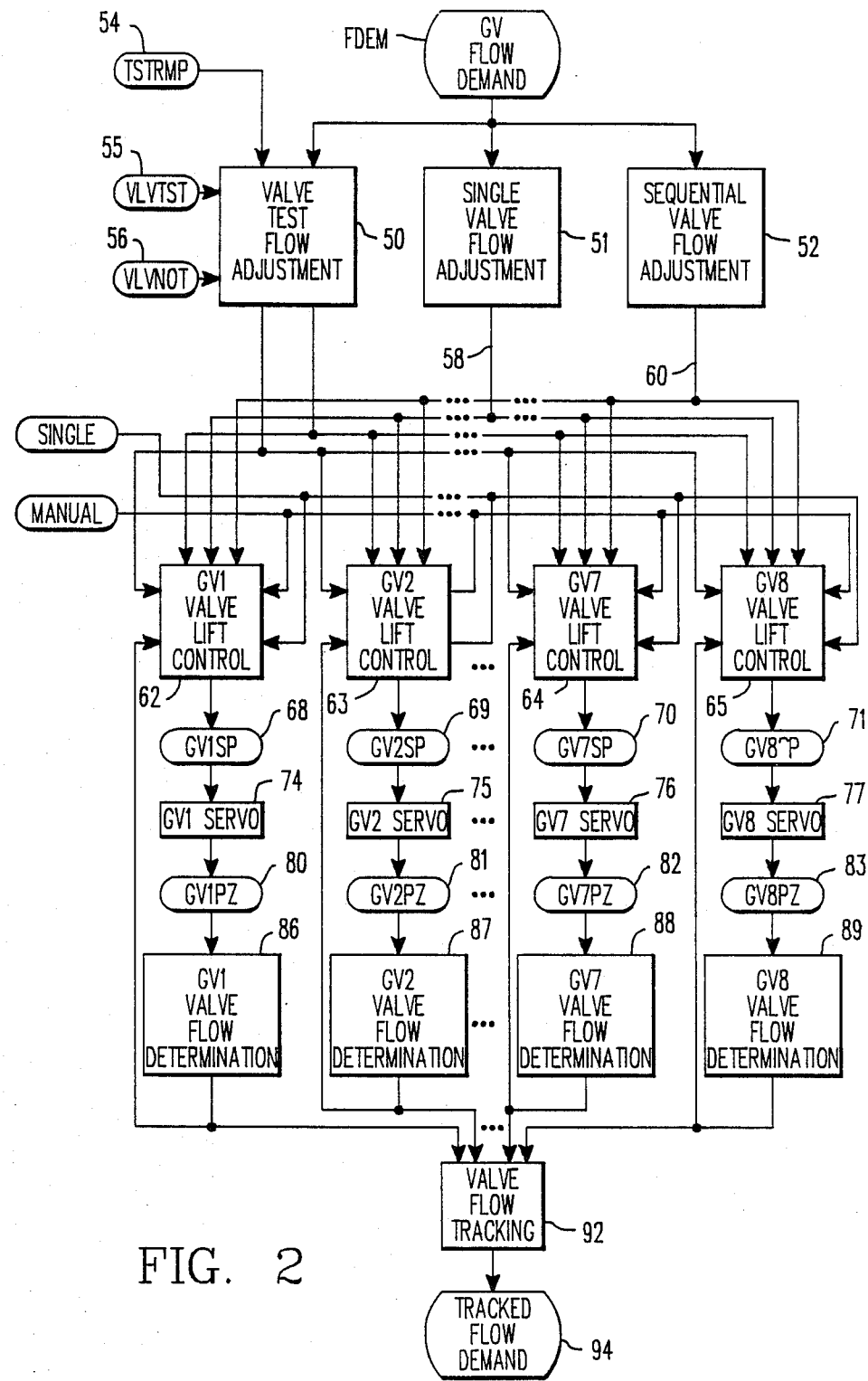
FIG. 2 is an overall block diagram of governor valve control.

The valve management control 48 is illustrated in more detail in FIG. 2. More detailed diagrams of portions of the block diagram illustrated in FIG. 2 are provided in FIGS. 3, 4 and 5. The blocks (although not the reference numerals) of FIGS. 2-4 and 6 substantially correspond to the blocks in FIGS. 1 and 3-5 of U.S. patent application Ser. No. 153,301 filed Feb. 5, 1988, incorporated herein by reference. The portions of the valve controller illustrated in FIGS. 2-4 and 6 relevant to system calibration will be described below. More detailed information regarding the operation of the valve controller is provided in Ser. No. 153,301.

The flow demand FDEM is supplied to three set point adjustment units 50-52. Testing of individual valves is performed by valve test flow adjustment unit 50 in accordance with test signals 54-56. The valve test flow adjustment unit 50 is not used for calibration, but rather for testing one or more valves during operation of the turbine. In the calibration mode, the target demand 10 is automatically changed in accordance with the procedure illustrated in FIG. 5 as described below. Instead, the single valve flow adjustment unit 51 and sequential valve flow adjustment unit 52 are used during calibration. Only one of these units 51 and 52 is active at any given time (except when switching from one to the other) to produce a single flow set point signal 58 and sequential flow set point signal 60, respectively. The set point signals are supplied to individual valve lift control units 62-65. In the embodiment illustrated in FIG. 2, there are eight governor valves for the turbine and therefore eight valve lift control units, four of which are illustrated in FIG. 2. The valve lift control units 62-65 provide position control signals 68-71 to servo units 74-77 which in turn output sense position signals 80-83. The sense position signals 80-83 are supplied to valve flow determination units 86-89 to produce outputs subjected to valve flow tracking calculations 92 to determine track flow demand 94.

Figure 3:
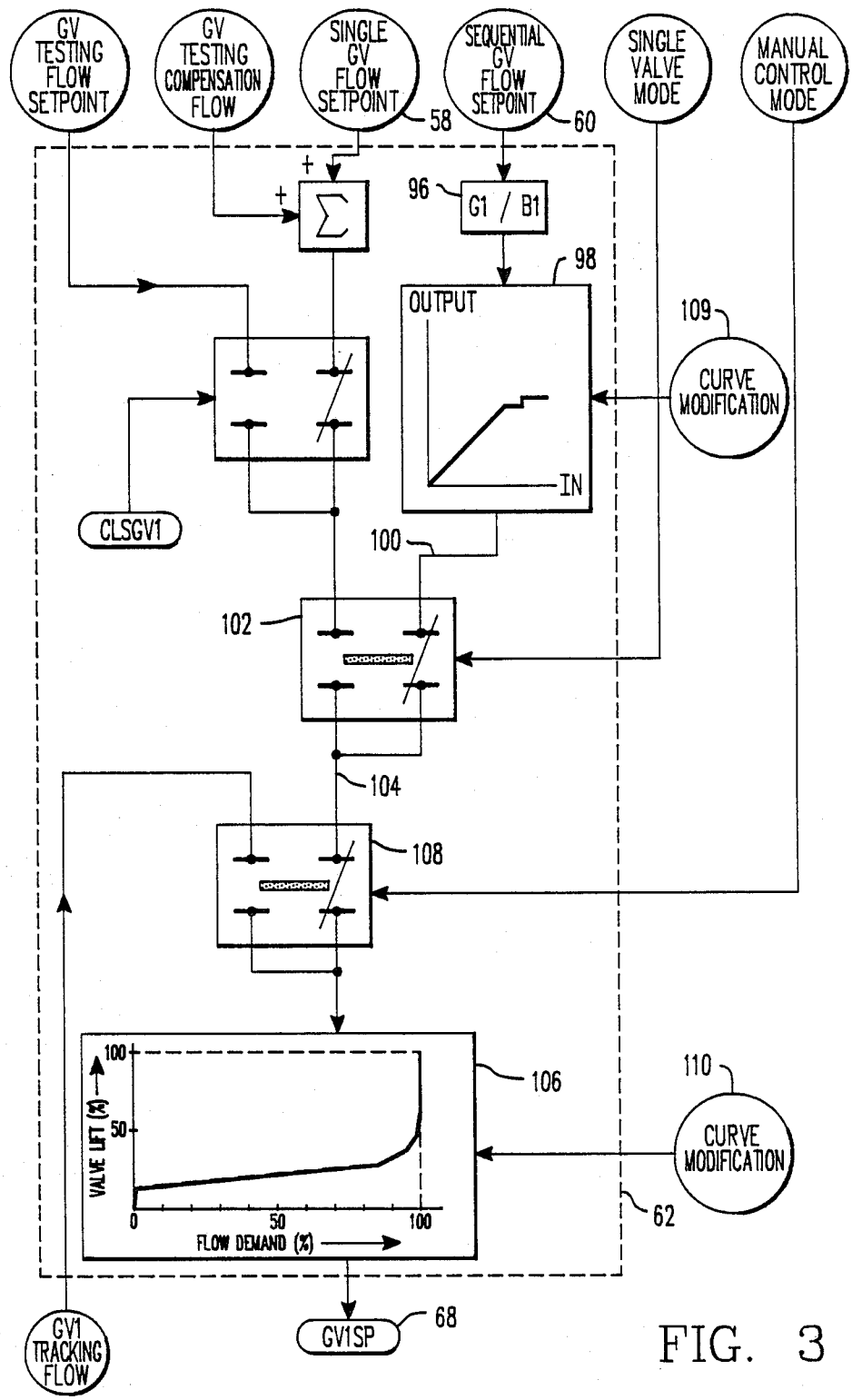
FIG. 3 is a more detailed block diagram of one of the valve lift control units in FIG. 2.

A block diagram of the valve lift control unit 62 for governor valve GV1 is illustrated in FIG. 3. In the sequential mode of operation, the sequential flow set point signal 60 is multiplied by gain G1 and reduced by bias B1 in gain/bias computation unit 96 prior to being supplied to sequential valve characteristic 98. The sequential valve characteristic 98 converts the modified sequential valve flow signal to a sequential adjusted flow signal 100. Rate-limited selection means 102 selects the sequential adjusted flow signal 100 in the sequential valve mode and the single flow set point signal 58 in the single valve mode. The output 104 from rate-limited selection means 102 is applied to a flow-to-lift conversion characteristic 106 via another rate-limited selection means 108. The flow-to-lift characteristic 106 converts the output 104 from rate-limited selection means 102 into the GV1 valve position set point signal 68. As indicated by signals 109 and 110, the sequential valve characteristic 98 and flow-to-lift conversion characteristic 106 can be modified in response to measurements of system performance according to the present invention.

Figure 4:
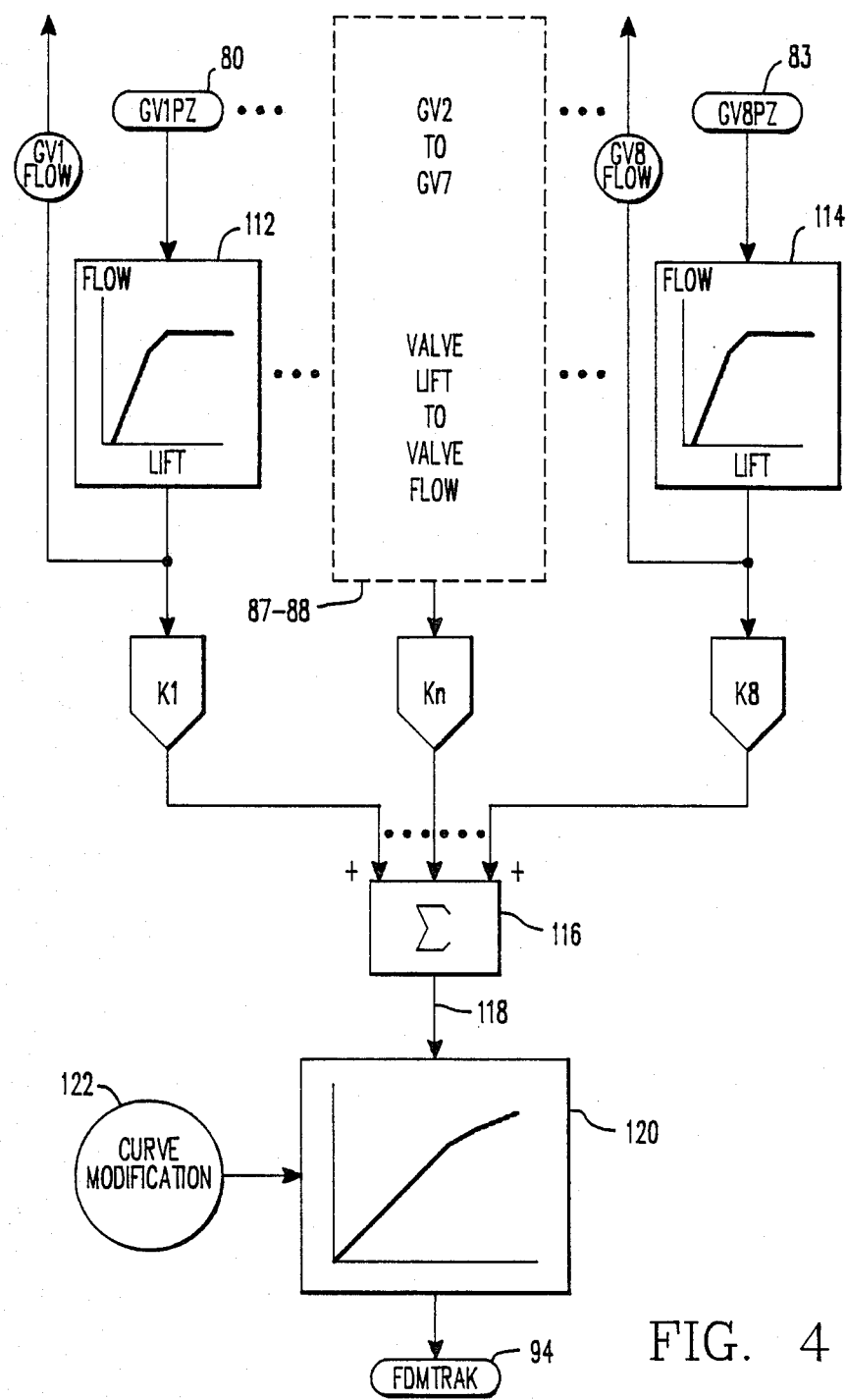
FIG. 4 is a more detailed block diagram of the lift-to-flow blocks and the valve flow tracking units in FIG. 2;.

A more detailed block diagram of blocks 86-89, 92 and 94 is provided in FIG. 4. The sensed position signals 80-83 are converted from valve lift to valve flow in valve flow determination units 86-89 using lift-to-flow characteristics 112 and 114. The output from the valve flow determination units 86–89 is summed in summer 116 to produce an unchoked flow signal 118. The unchoked flow signal 118 is corrected by a choking factor determined from unchoked/choked flow characteristic 120 to produce the tracked flow demand signal 94. As indicated by curve modification signal 122, the unchoked/choked flow characteristic 120 is modifiable in accordance with the present invention.

Figure 5:
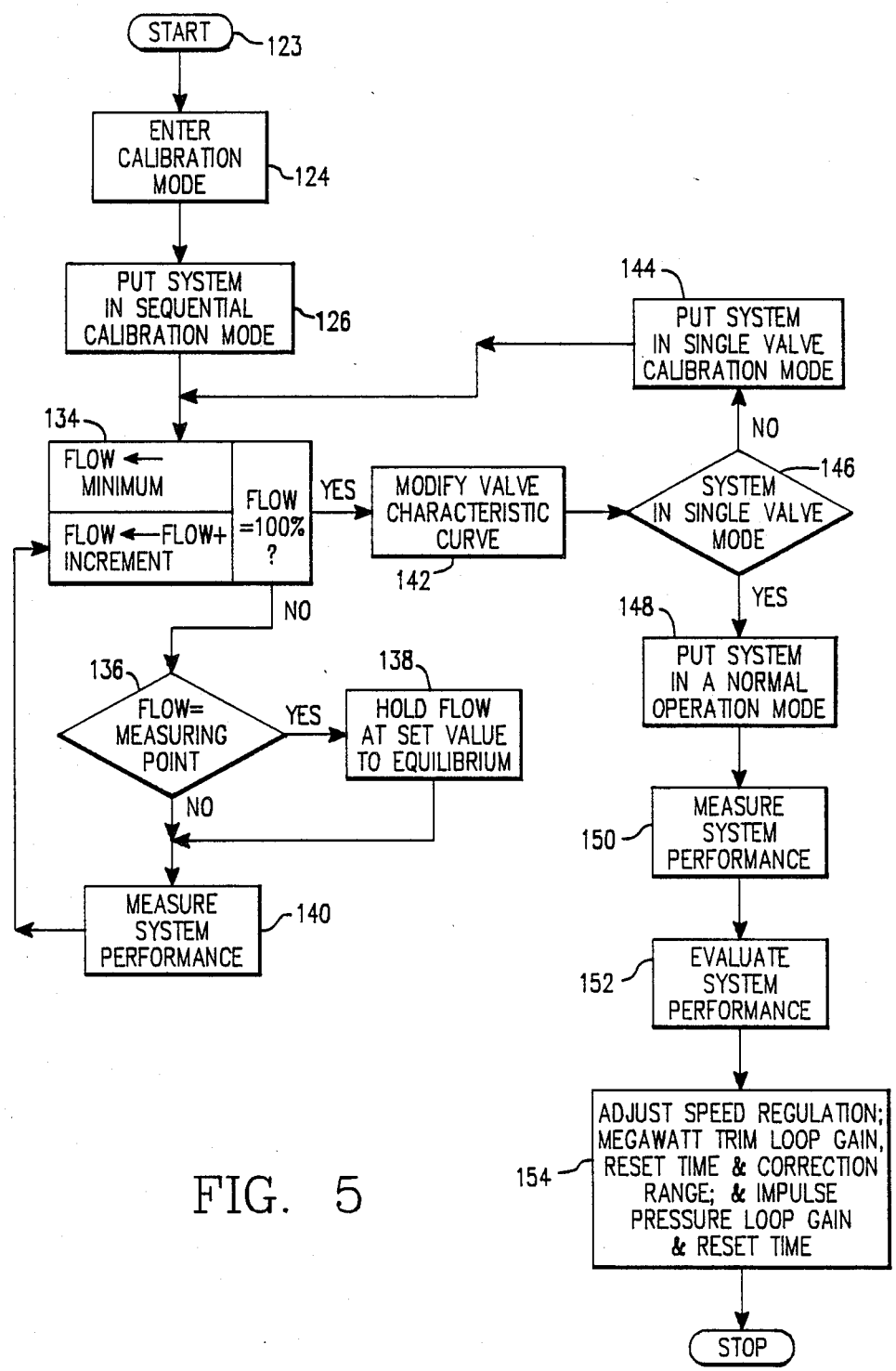
FIG. 5 is a flow chart of a method for calibrating an automatic controller for a steam turbine according to the present invention;.
Figure 6:
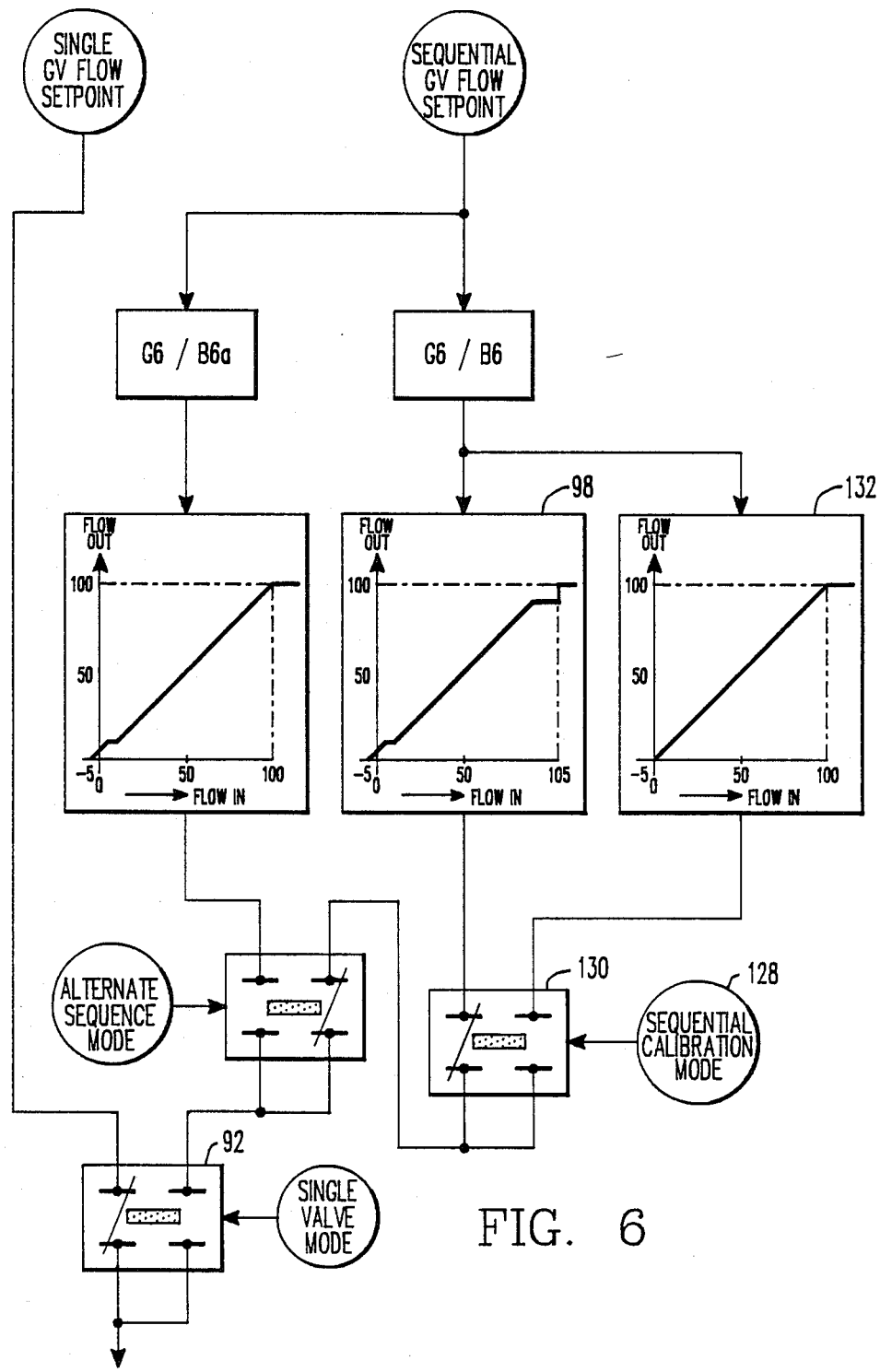
FIG. 6 is a detailed block diagram of alternate sequential modes of operation.

As illustrated in FIGS. 5 and 6, calibration of an automatic valve control system according to the present invention is started at 123 by entering the calibration mode 124. Initially, the system is put in sequential calibration mode 126 by producing a sequential calibration mode signal 128 which controls rate-limited selection means 130 (FIG. 6) to select between sequential valve characteristic 98 and sequential calibration mode characteristic 132. This produces non-overlapping operation of the valves during the sequential mode calibration.

Putting the system in sequential calibration mode also involves preventing feedback control from signals 22, 28 and 36, while providing throttle pressure compensation 44 in response to signal PO 46. Also, during both sequential calibration mode and single or unison valve calibration mode, boiler follow control is used to more closely match the operation of the turbine during the calibration procedure.

Once all of the above control settings have been made, the target demand 10 is gradually increased at 134 from minimum load to 100% or full load at a rate of, e.g., 5% per minute. As the flow increases, flow demand FDEM is compared at 136 to predetermined levels of operation, e.g., 1/10, 1, 50, 80, 90, 95, 97, 98 and 100% of capacity. When the flow demand matches one of these points, the increase in the target demand is stopped and the valve settings are maintained (138) at preset values, determined from the sequential valve characteristic 98, corresponding to the predetermined levels of operation until the system substantially reaches equilibrium. At this time, the system performance, including power, produced is measured at 140 and the target demand is again increased until the next predetermined level of operation is reached.

In the flow chart illustrated in FIG. 5, system performance is indicated as being measured continuously except while the system is held to reach equilibrium. This is only one way of measuring system performance. If less data is desired, system performance could be measured only at the equilibrium points, immediately following step 138 and when the flow is not equal to a measuring point, the flow could be increased without making any measurements. Similarly, the measurements could be made during the time allowed for the system to reach equilibrium so that it could be verified that equilibrium was reached.

After the system performance has been measured at 100% of capacity, the sequential valve characteristic 98 can be modified to more closely match the level of operation actually achieved to the target demand. Although only a single pass through steps 134, 136, 138 and 140 is illustrated for the sequential calibration mode, these steps can be repeated until little or no adjustment is necessary to the sequential valve characteristics. In this case, it is desirable to reverse the direction of the change in target demand during even passes through the loop. In other words, after reaching 100% of capacity the target demand is preferably decreased at a rate of 5% per minute and held at each of the predetermined measuring points. Preferably, two passes are averaged before modifying the characteristic 132. The modifications made to the sequential calibration characteristic 132 can then be mapped onto the sequential valve characteristic 98.

After the sequential valve characteristic is determined to be properly calibrated, the system is placed at 144 in single valve calibration mode. To simplify the flow chart illustrated in FIG. 5, a decision block 146 is illustrated to indicate that essentially the same steps 134, 136, 138, 140 and 142 are followed in the single valve calibration mode. In addition, the loop between steps 134 and 140 is preferably repeated at least twice in the single valve calibration mode, as discussed above with respect to the sequential valve calibration mode. In step 142, the single valve characteristic 106 (FIG. 3) is modified.

Figure 7D:
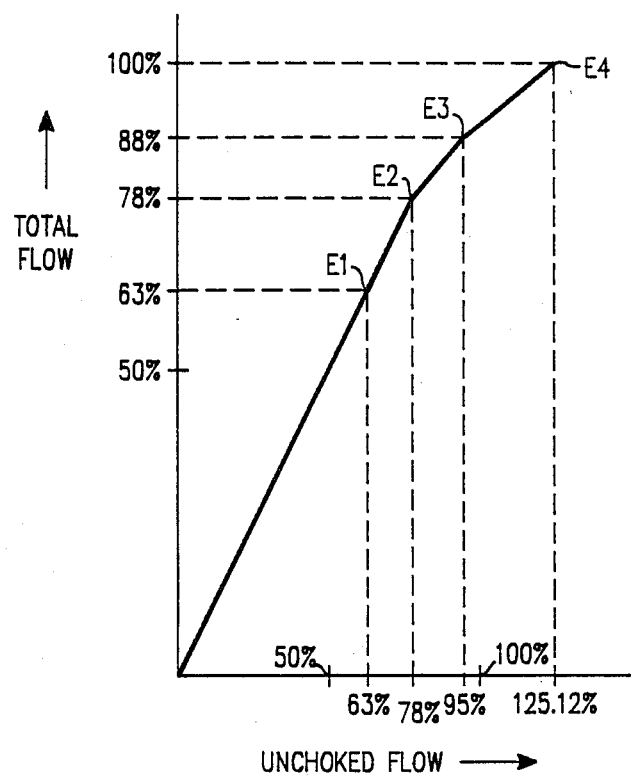

In FIGS. 7A and 7C, examples of the points which are modified in step 142 are illustrated. A graphical representation of flow demand versus valve lift in the sequential valve calibration mode is illustrated in FIG. 7A. Initially, a group of valves, e.g., three valves, are raised in unison and the correspondence between the indicated points QI1–QI7 are checked by comparing the corresponding flow demand with the measured system performance. Then, the remaining valves are raised in groups of one or two and similar points are measured as indicated, starting from points QII1, QIII1 and QIV1. According to the present invention, the operator is also given the opportunity to modify the amount of overlap between the groups of valves, as graphically illustrated in FIG. 7B. For the single valve mode, similar measurements are made and points G1–G7 are determined for the single valve characteristic 102, as illustrated in FIG. 7C. In addition, the measurement of system performance provides the data required to modify the unchoked/choked flow characteristic 120 (FIG. 4) at points E1–E4 as illustrated in FIG. 7D.

Returning to FIG. 5, after all the modifications have been made to the characteristic curves, the system is placed at 148 in a normal operation mode. At this time or at any other time during operation of the system, e.g., every six months, system performance can be measured to determine whether the higher level controls illustrated in FIG. 1 are properly set. First, the system performance is measured at 150 and then evaluated at 152. Preferably, steps 150 and 152 are performed by connecting an evaluation processor, such as an IBM PC, to the automatic controller to receive the system performance measurements. Conventional software, such as PROCESS PLUS available from Gerry Engineering Software of Lockport, Ill. can be executed on an IBM PC to optimize the performance of the controller. Other process optimization software is also available. However, all of these, including PROCESS PLUS, are apparently used primarily to evaluate the control of chemical processes.

The result of the evaluation 152 are displayed to the operator of the turbine so that adjustments 154 can be made to speed regulation 24, megawatt trim loop correction 30, including gain, mega time and correction range, and impulse pressure correction, including gain and reset time.

Other calibrations requiring manual steps are also made easier by use of the present invention. For example, the use of software to control the valves also provides the ability to modify valve servo loop gain and reset time from the control panel. Similarly, valve position sensor calibration, both nulling and ranging, can be made easier by presenting a graphic display of the sensed position that can be compared with the actual position.

The many features and advantages of the present invention are apparent from the detailed specification and thus, it is intended by the appended claims to cover all such features and advantages of the method which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method of calibrating an automatic controller for a system controlled by adjusting valves in dependence upon a correspondence between valve settings and levels of operation of the system, said method comprising the steps of:
   (a) establishing a calibration mode of operation of the system;
   (b) automatically modifying the valve settings over a full range of operation of the valves during operation of the system;
   (c) automatically maintaining the valve settings at preset values corresponding to predetermined levels of operation during said modifying in step (b), the preset values of the valve settings being maintained for a sufficient period of time for the system to substantially reach equilibrium;
   (d) automatically measuring system performance for each of the preset values of the valve settings maintained in step (c); and
   (e) modifying the correspondence between the valve settings and the levels of operation in dependence upon differences between the system performance measured in step (d) and each of the predetermined levels of operation.

2. A method as recited in claim 1,
wherein the valves are operable in unison and sequential modes,
wherein said establishing in step (a) includes initially placing the system in the sequential mode of valve operation, and
further comprising the steps of:
   (f) placing the system in the unison mode of valve operation after steps (b)–(e) are completed for adjusting the correspondence between the valve settings and the levels of operation in the sequential mode of valve operation; and
   (g) repeating steps (b)–(e) after step (f) to adjust the correspondence between the valve settings and the levels of operation in the unison mode of operation.

3. A method as recited in claim 2, wherein said modifying in step (e) comprises modifying one of a unison valve characteristic and a sequential valve characteristic depending on the mode of valve operation selected.

4. A method as recited in claim 2, further comprising the step of (h) modifying the sequential valve characteristic for at least one of the valves to adjust overlapping of the valves in the sequential mode of valve operation.

5. A method as recited in claim 4, wherein the system comprises a steam-driven turbine coupled to a boiler, and
wherein said establishing in step (a) comprises:
   (ai) automatically preventing feedback control;
   (aii) automatically selecting non-overlapping operation of the valves during the sequential mode; and
   (aiii) automatically providing throttle pressure compensation and boiler follow control.

6. A method as recited in claim 2, wherein the system comprises a steam-driven turbine coupled to a boiler, and
wherein said establishing in step (a) comprises:
   (ai) automatically preventing feedback control;
   (aii) automatically selecting non-overlapping operation of the valves during the sequential mode; and
   (aiii) automatically providing throttle pressure compensation and boiler follow control.

7. A method as recited in claim 1, further comprising the step of (f) permitting adjustment of at least one of servo loop gain and reset time corresponding to a range of valve settings.

8. A method as recited in claim 1,
wherein said modifying in step (b) comprises changing the valve settings from minimum load to full load and returning to minimum load, and
wherein said modifying in step (e) is performed in dependence upon an average of first values measured in step (d) during said changing from minimum load to full load with respective second values measured in step (d) during said returning from full load to minimum load.

9. A method of adjusting an automatic controller for a steam-driven turbine coupled to a boiler, the controller adjusting governor valves for the steam-driven turbine in dependence upon a correspondence, provided for sequential and unison modes, between valve lift and flow demand, said method comprising the steps of:
   (a) establishing a calibration mode of operation, comprising the steps of:
      (ai) automatically preventing feedback control;
      (aii) automatically selecting non-overlapping operation of the valves during the sequential mode; and
      (aiii) automatically providing throttle pressure compensation and boiler follow control;
   (b) automatically changing the flow demand to cover a full range of valve positions during operation of the steam-driven turbine;
   (c) automatically maintaining the flow demand at predetermined levels of demand during said changing in step (b), each of the predetermined levels of flow demand being maintained for a sufficient period of time for the operation of the steam-driven turbine to substantially reach equilibrium;
   (d) automatically measuring power produced by the steam-driven turbine at each of the predetermined levels of flow demand maintained in step (c);
   (e) adjusting the correspondence between valve lift and flow demand in dependence upon differences between the power measured in step (d) and desired amounts of power corresponding to the predetermined levels of flow demand.

10. A method as recited in claim 9, further comprising the steps of:
   (f) establishing a normal operation mode of the system;
   (g) automatically recording the system performance during the normal operation mode of the system established in step (f);
   (h) performing computerized evaluation of the system performance recorded in step (g); and
   (i) adjusting, in dependence upon the results of step (h), positive and negative speed regulation, megawatt trim loop gain, reset time and loop correction range, and impulse pressure loop gain and reset time.

* * * * *